UNITED STATES PATENT OFFICE.

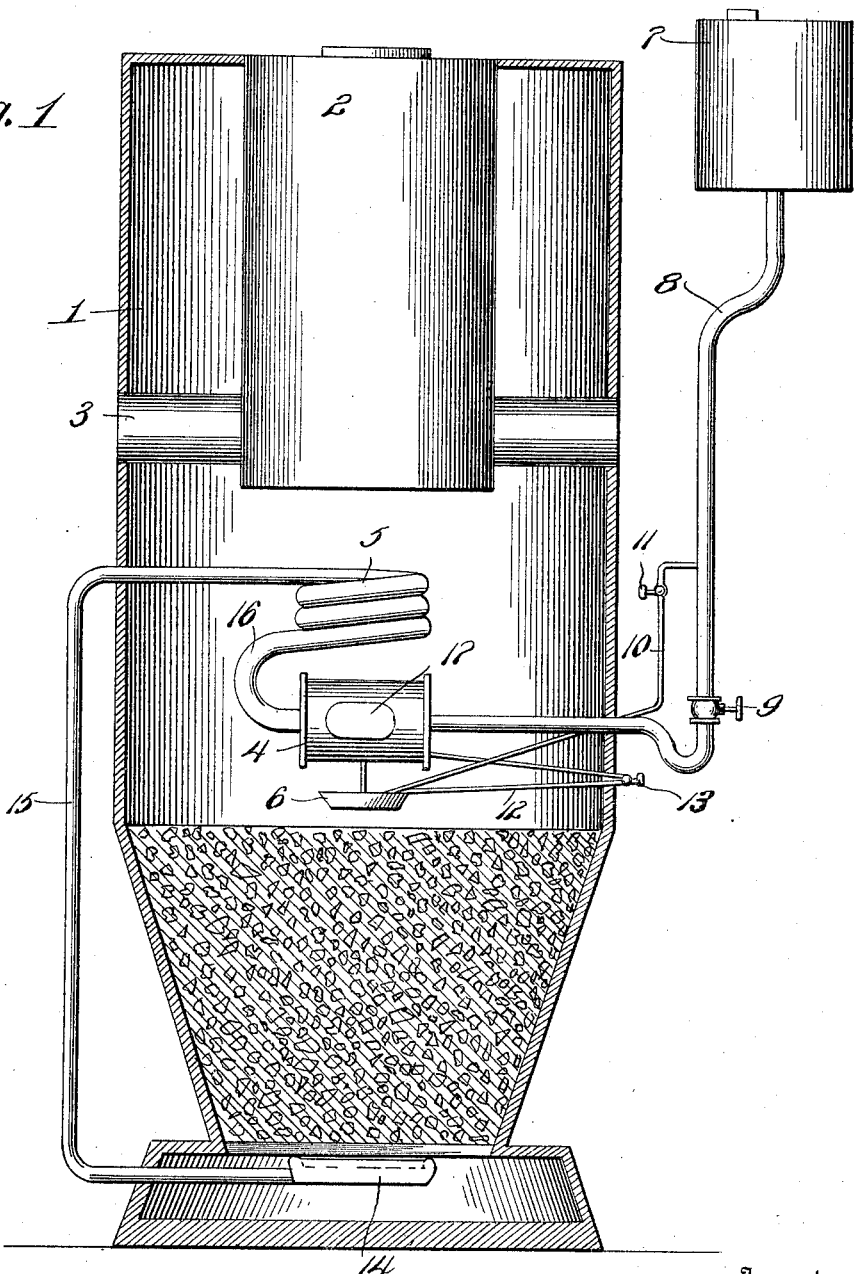

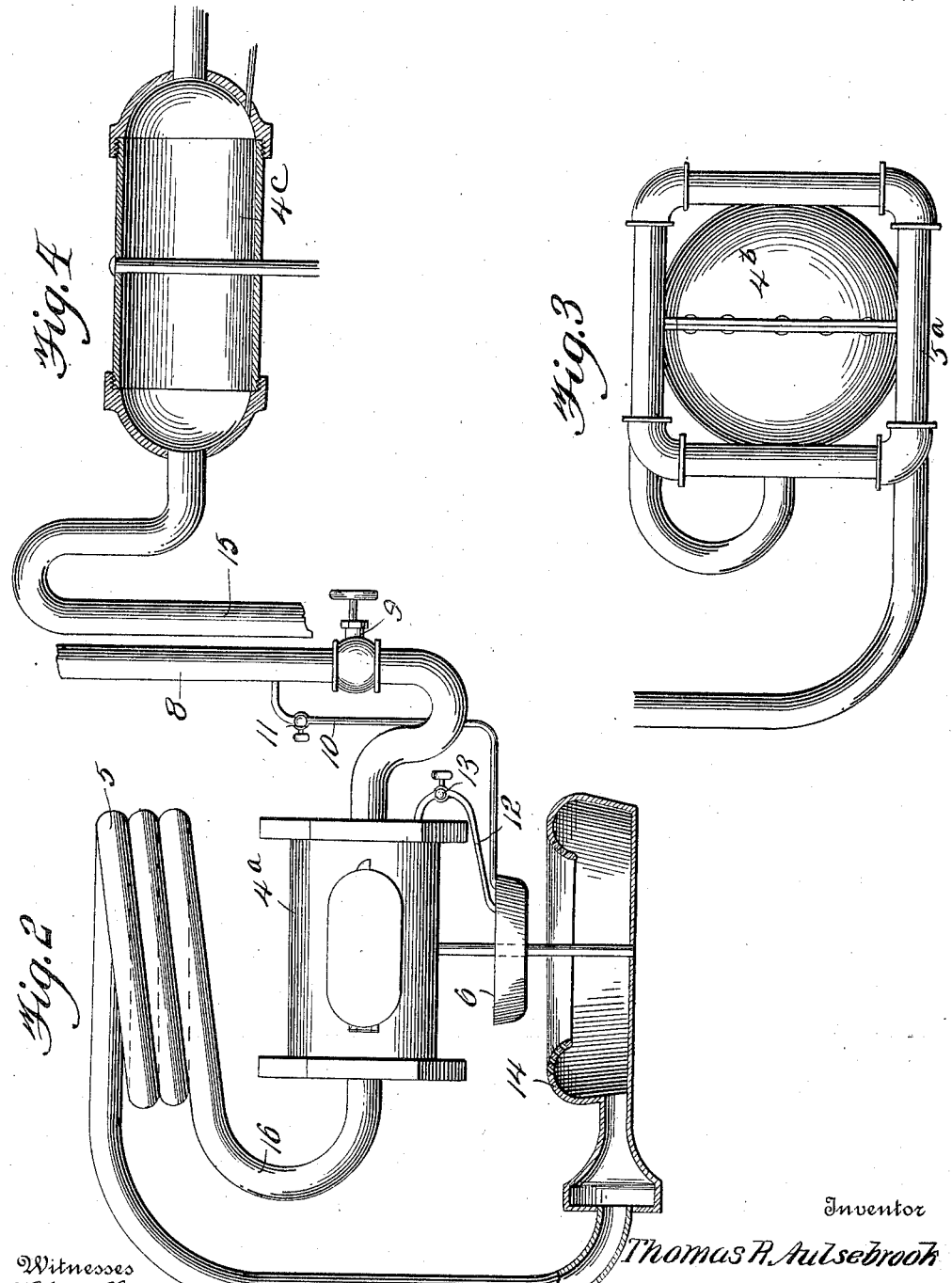

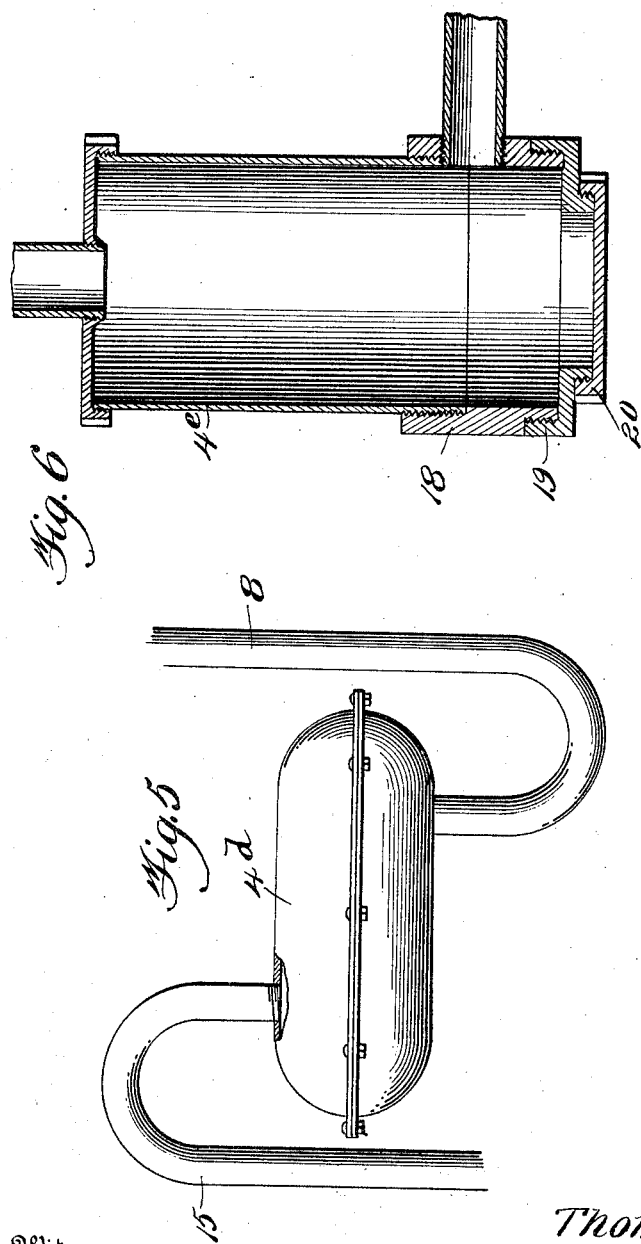
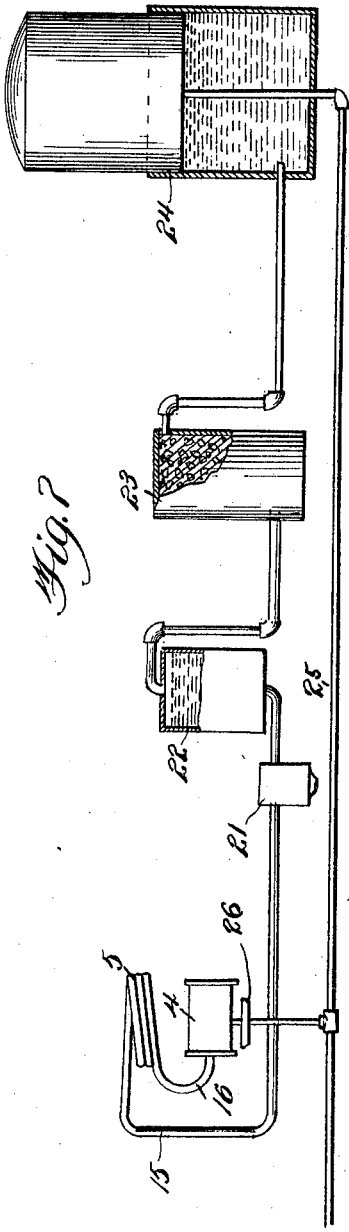

THOMAS R. AULSEBROOK, OF LOUISVILLE, KENTUCKY.

LIQUID-FUEL BURNER.

1,038,712.  Specification of Letters Patent.  Patented Sept. 17, 1912.

Application filed November 11, 1911. Serial No. 659,795.

*To all whom it may concern:*

Be it known that I, THOMAS R. AULSEBROOK, a citizen of the United States, residing at Louisville, in the county of Jefferson and State of Kentucky, have invented new and useful Improvements in Liquid-Fuel Burners, of which the following is a specification.

The purpose of this invention is the provision of a means or system for utilizing hydro-carbon as fuel, the means embodying a generator which may be readily drained and cleaned of all residue.

The invention contemplates in combination with the generator a coil for superheating the gas from the generator, thereby producing a gaseous fuel which will produce the best results either for heating or illuminating or for any purpose in the industrial arts for which gas may be required for use.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a detail view of a heating stove provided with means embodying the invention. Fig. 2 is a view of a modified form of the invention adapted for general use. Fig. 3 shows a different form of generator and superheating coil. Fig. 4 is a further modification of the generator. Fig. 5 is a further modification of the generator. Fig. 6 is still a further modified form of generator. Fig. 7 is a detail view, showing the invention adapted for generating gas which is stored for future use.

Corresponding and like parts are referred to in the following description, and indicated in all the views of the drawings, by the same reference characters.

As indicated in Fig. 1 the body of the stove or heater 1 may be of any construction and is provided in its upper portion with an air chamber 2 with which passages 3 communicate, the latter extending outwardly from the lower end of the chamber through the walls of the stove. The burner is located in the combustion chamber and comprises a generator 4 a coil 5 and a pan 6, the latter being arranged below the generator 4 and the coil 5 directly above the generator and within the zone of the heat derived from the burning of the oil in the pan 6. The oil supplied from any source, as a tank 7, is fed to the generator by means of a pipe 8, a valve 9 being located in the length of the pipe 8 to regulate the amount of oil passing through the pipe in a given time. A small pipe 10 is connected with the pipe 8 and is arranged to discharge into the pan 6, said small pipe having a valve 11. A drain pipe 12 connects with the lower portion of the generator and is arranged to discharge into the pan 6, said drain pipe being in the form of a loop and projecting beyond the side of the heater and having the projecting portion provided with a valve 13. A burner 14 of any type consisting of a hollow body having a plurality of small outlets is located below the fire pot of the heater and is connected by means of a pipe 15 with the upper portion of the coil 5, a pipe 16 connecting the lower portion of the coil 5 with the generator. It is proposed to fill the fire pot of the stove with broken material, such as brick, stones or the like, the flame passing upwardly through the spaces of the loose material when the burner 14 is in operation. The fumes are carried off by means of a smoke pipe in the usual manner. A door 17 is provided in a side of the chamber 4 and provides convenient means for removing residue or other accumulations.

In the modification shown in Fig. 2 the burner 14 is located immediately below the pan 6 and in close proximity to the chamber 4ª so that the heat from the burner will convert the hydrocarbon or oil in the chamber 4ª into a gaseous fluid, which is led to the coil 5 and from thence to the burner 14 or to the other place of use.

In Fig. 3 the generator 4ᵇ is shown as of circular form and the coil 5ª as angular, the same being made up of elbows and a number of short lengths of pipe.

In Fig. 4 the generator 4ᶜ is shown as of cylindrical form and the heads are of semispherical shape and the pipe 15 leading from the generator to the burner proper has an upwardly curved portion to prevent any unconverted hydrocarbon passing from the generator to the burner.

In Fig. 5 the generator 4ᵈ is illustrated as being composed of upper and lower halves or sections which are flanged, the flanges having apertures through which bolts or fastenings pass for securing the sections when assembled. The pipe 15 connects with the upper portion of the generator and the pipe 8 with the lower portion, the points of connection being at diagonally opposite points.

In the modification shown in Fig. 6 the generator 4e is provided at its lower end with a collar or band 18 to which may be fitted caps 19 and 20 which admit of access being readily had to the interior of the generator for cleaning or other desired purpose.

In the arrangement illustrated in Fig. 7 the invention is adapted for generating gas which is stored for subsequent use. The gas pipe 15 leading from the coil 5 is provided in its length with a trap 21, which catches all impurities capable of precipitation. The gas is discharged from the pipe 15 into a water tank 22, which purifies the gas and removes all particles of hydrocarbon that may have passed off without being converted into gas. The purified gas after leaving the water tank 22 is rendered anhydrous by its passage through a tank 23 containing lime. The gas is finally discharged into a gas meter 24 of ordinary construction from which the gas is drawn when required for use. A pipe 25 leads the gas from the meter to the required point of use and has a burner 26 connected therewith for heating the generator 4.

From the foregoing it will be readily understood that the invention may be adapted for steam boilers for stationary, marine or portable steam engines or may be used for hot water boilers or for heating generally, or for generating gas to be subsequently used either for illuminating, heating or as motive medium in the driving of explosive engines.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In means for burning oil, the combination of a generator, means for supplying oil to the generator, means for heating the oil in the generator to convert the same into gas, a pan arranged beneath the generator and a small pipe tapped into the lower portion of the generator and extending outwardly therefrom and formed into a loop and terminating over the pan to discharge oil therein from the generator, and a valve in the length of said pipe.

2. In means for burning oil, the combination of a generator, a pan located below the generator and in close proximity thereto, a pipe for leading the oil from a source of supply to the generator, a small pipe tapped into the oil supplying pipe and leading to the said pan and having a valve in its length, and a second small pipe having connection with the lower portion of the generator and formed into a loop and terminating over the before mentioned pan to discharge oil therein from the generator, the last mentioned pipe having a controlling valve in the outer end of the loop.

3. In means for burning oil, the combination of a generator, a pipe having connection with the generator for supplying oil thereto, a burner arranged beneath the generator, a coil located above the generator and having connection with the said generator and with the burner, a pan arranged below the generator and between it and the burner, a drain pipe having connection with the lower portion of the generator and formed into a loop and terminating above the said pan, and a small pipe tapped into the oil supplying pipe and likewise terminating above the said pan, both the drain pipe and the said small pipe having a valve in their length.

In testimony whereof I affix my signature in presence of two witnesses.

THOMAS R. AULSEBROOK.

Witnesses:
H. W. BATSON,
R. W. COLE.

---

Copies of this patent may be obtained for five cents each, by addressing the "Commissioner of Patents, Washington, D. C."